United States Patent
Bossone, III

(10) Patent No.: US 12,284,994 B2
(45) Date of Patent: Apr. 29, 2025

(54) FISHING LURE

(71) Applicant: Martin Dominic Bossone, III, North Royalton, OH (US)

(72) Inventor: Martin Dominic Bossone, III, North Royalton, OH (US)

( * ) Notice: Subject to any disclaimer, the term of this patent is extended or adjusted under 35 U.S.C. 154(b) by 0 days.

(21) Appl. No.: 13/763,144

(22) Filed: Feb. 8, 2013

(65) Prior Publication Data

US 2014/0223799 A1 Aug. 14, 2014
US 2018/0317469 A9 Nov. 8, 2018

Related U.S. Application Data

(62) Division of application No. 12/799,344, filed on Apr. 22, 2010, now abandoned.

(60) Provisional application No. 61/216,875, filed on May 22, 2009, provisional application No. 61/214,406, filed on Apr. 23, 2009.

(51) Int. Cl.
*A01K 85/12* (2006.01)
*A01K 85/10* (2006.01)

(52) U.S. Cl.
CPC ............ *A01K 85/12* (2013.01); *A01K 85/10* (2013.01)

(58) Field of Classification Search
CPC ......... A01K 85/12; A01K 85/01; A01K 85/10
USPC ................................ 43/42.14, 42.19, 42.24
See application file for complete search history.

(56) References Cited

U.S. PATENT DOCUMENTS

| | | | | |
|---|---|---|---|---|
| 671,613 | A * | 4/1901 | Shakespeare | A01K 85/10 43/42.35 |
| 800,536 | A * | 9/1905 | Bailey | A01K 85/10 43/42.39 |
| 870,069 | A * | 11/1907 | Wilcox et al. | A01K 85/10 43/42.35 |
| 1,299,703 | A * | 4/1919 | Gray | A01K 85/10 43/42.19 |
| 1,467,116 | A * | 9/1923 | Reekers | A01K 86/20 43/42.19 |
| 1,871,971 | A * | 8/1932 | Eppich | A01K 85/12 D22/128 |
| 1,874,102 | A * | 8/1932 | Jacobs | A01K 85/16 43/42.13 |
| 1,923,840 | A * | 8/1933 | Ozburn | A01K 85/16 43/42.13 |
| 2,209,161 | A * | 7/1940 | Gunderson | A01K 85/18 43/42.02 |
| 2,234,077 | A * | 3/1941 | Hayley, Jr. | A01K 85/18 43/42.48 |
| 2,606,387 | A * | 8/1952 | Garner | A01K 85/12 43/42.51 |

(Continued)

FOREIGN PATENT DOCUMENTS

JP 3029155 U 3/1996

*Primary Examiner* — Michael H Wang
(74) *Attorney, Agent, or Firm* — Benesch Friedlander Coplan & Aronoff LLP

(57) ABSTRACT

A fishing lure includes a longitudinal body, a pair of wing bars coupled at first ends thereof to the body by hinge pins and configured to hingedly rotate in a posterior and anterior direction relative to the body, wings with a plurality of blades disposed thereon slidably mounted on each wing bar and configured to spin on each wing bar, and wing locks configured to stop the wing bars from rotating any further posteriorly that a position that is perpendicular to a longitudinal axis of the body.

16 Claims, 19 Drawing Sheets

(56) References Cited

U.S. PATENT DOCUMENTS

| | | | | |
|---|---|---|---|---|
| 2,760,294 A * | 8/1956 | Morrill, Jr. | ............ | A01K 85/16 43/42.45 |
| 3,007,276 A * | 11/1961 | Lidert | .................... | A01K 85/16 43/26.2 |
| 3,093,923 A * | 6/1963 | Jackson | ................ | A01K 85/00 43/42.11 |
| 3,363,358 A * | 1/1968 | Johansson | .............. | A01K 85/14 43/42.13 |
| 3,397,478 A * | 8/1968 | Lowes, Jr. | ............. | A01K 85/01 43/42.31 |
| D212,609 S * | 11/1968 | Lott | ............................ | D22/128 |
| 3,500,573 A * | 3/1970 | Hudson | ................. | A01K 85/00 43/42.4 |
| 3,902,266 A * | 9/1975 | Howard | ................. | A01K 85/16 43/42.13 |
| 3,958,358 A * | 5/1976 | Firmin | ................... | A01K 85/00 43/42.27 |
| 4,884,358 A * | 12/1989 | Grove | .................... | A01K 85/00 43/42.13 |
| 5,003,723 A * | 4/1991 | Dutcher | ................. | A01K 85/14 43/42.13 |
| 5,084,997 A * | 2/1992 | DiPaola | ................. | A01K 85/10 43/42.24 |
| 5,094,026 A * | 3/1992 | Correll | ................... | A01K 85/00 43/42.11 |
| 5,105,573 A | 4/1992 | Mays | | |
| 5,193,299 A * | 3/1993 | Correll | ................... | A01K 85/00 43/42.24 |
| 5,694,714 A | 12/1997 | Basso | | |
| 5,732,502 A | 3/1998 | Hansen | | |
| 5,970,647 A * | 10/1999 | Watkins | ................ | A01K 85/08 43/42.09 |
| 6,108,964 A | 8/2000 | Noorlander | | |
| 6,516,553 B1 * | 2/2003 | King | ...................... | A01K 85/14 43/42.16 |
| 7,065,918 B2 * | 6/2006 | Leone | .................... | A01K 91/04 43/42.02 |
| 7,360,335 B2 * | 4/2008 | Edwards | ................ | A01K 85/00 43/42.13 |
| D641,452 S * | 7/2011 | Clos | ............................. | D22/132 |
| 8,397,425 B1 * | 3/2013 | Alzamora | ............. | A01K 83/00 43/42.02 |
| 9,439,407 B2 * | 9/2016 | Signitzer | ................ | A01K 85/16 |
| 2004/0221502 A1 * | 11/2004 | Eubanks | ................ | A01K 85/00 43/42.13 |
| 2006/0037231 A1 * | 2/2006 | Moore | ................... | A01K 85/00 43/42.28 |
| 2007/0017145 A1 * | 1/2007 | Burt | ....................... | A01K 85/01 43/42.53 |
| 2007/0277423 A1 * | 12/2007 | Edwards | ................ | A01K 85/00 43/42.13 |
| 2008/0202015 A1 * | 8/2008 | Langer | ................... | A01K 85/00 43/42.06 |
| 2008/0271358 A1 * | 11/2008 | Meroney | ................ | A01K 85/16 43/26.2 |
| 2009/0094879 A1 | 4/2009 | Beck | | |
| 2009/0126256 A1 * | 5/2009 | Gregory | ................ | A01K 85/00 43/42.15 |
| 2010/0293833 A1 * | 11/2010 | Bossone, III | ................. | 43/17.6 |
| 2011/0277371 A1 * | 11/2011 | Norman | ....................... | 43/42.06 |
| 2012/0005940 A1 * | 1/2012 | Thomas | ................ | A01K 85/01 43/17.1 |
| 2012/0066955 A1 * | 3/2012 | Hrncir | ................... | A01K 85/00 43/42 |
| 2013/0185989 A1 * | 7/2013 | Langer | ........................ | 43/42.11 |

\* cited by examiner

FISHING LURE

CROSS REFERENCE TO RELATED APPLICATIONS

This application claims priority to U.S. patent application Ser. No. 12/799,344, filed on Apr. 22, 2010 and entitled Fishing Lure, which claims priority to U.S. Provisional Application Ser. No. 61/214,406, filed on Apr. 23, 2009 and entitled Spinning Dragonfly Bait, and Provisional Application Ser. No. 61/216,875, filed on May 22, 2009 and entitled Top Water Floating Insect Lure, the contents of each of which are incorporated herein by reference.

FIELD OF THE INVENTION

The present invention is directed to a fishing lure. Angling, or fishing, refers to the catching of fish by means of hook and line and may be referred to as sport fishing or game fishing. The present invention may be applicable to any type of fishing, whether done for sport, commercial, personal or any use.

BACKGROUND OF THE INVENTION

Fishing bait may be affixed to the end of a fishing line, which also contains a hook or a snag, needed to trap, ensnare or catch fish. While live bait may be preferable, it can be costly, messy and unpleasant to work with. In many conditions, man-made bait may be preferred. It is well known in the field of fishing that man-made bait, or a lure, used to attract fish, is more beneficial and advantageous when the lure has life-like, or organic, qualities. In order to achieve this, various non-organic lures have been designed to mimic organic bait by creating man-made worms, fish, eggs, insects, reptiles, amphibians and other water-born animals as well as plants and fungi. Further, lures have been designed to exhibit organic qualities, including various colors, shapes, lights, sounds, scents and movements. Movements have been a particularly challenging feature. One type of movement is body movement. In order to give the lure the features of body movement, the combination of the angler's efforts to pull the lure and hook across or through water in conjunction with features on the lure itself may result in the appearance of the lure "swimming" across or through the water. This has been accomplished in the prior art through symmetrical and partially asymmetrical contouring of the front and back of a tube-shaped or minnow shaped fish. Another way that this has been accomplished is by the addition of a "bill," or flat, downward piece in the "front" of the lure, so that the that the forward and/or forward and sideways movement implemented on the fishing line by the angler causes the lure to "dive" into the water while the opposing floatation force ultimately yields an up and downward action that mimics swimming. Another way that movement has been accomplished is by portioning the lure into two or more segments attached by a pivoting or rotating connector so that the angler's forward and/or forward and sideways movement implemented on the fishing line gives the appearance that the lure is sculling and mimics the forward propulsion accomplished by live prey through the contraction and relaxation of muscle blocks. Another way that movement has been accomplished is by the positioning of various fins that cause the lure to move in particular directions. Yet another way that movement has been accomplished is by the addition of one or more loosely connected spinners, skirts, tails or fins that spin, waive or shake as a result of the friction of the water imparted by the angler's forward and/or forward and sideways movements imparted on the line. Finally electronic fishing lure have become popular because built in mechanisms can cause the lure to behave in a desired manner. Despite the variations employed in the prior art, the life-like qualities of organic prey sought by fish have not suitably been achieved and disadvantages of prior art still exist.

SUMMARY OF THE INVENTION

In view of the foregoing described and other obvious disadvantages inherent in the known types of fishing lures presently existing in the prior art, the present invention provides a new fishing lure that better mimics the swimming action of prey and is substantially more attractive to fish. The present invention describes and claims, among other features, a fishing lure with a rigid, segmented body, such that in conjunction with other prior features, the present invention describes a drastically improved fishing lure that yields substantially greater results. The inventor has discovered that the rigid segmented lure obtains increased roll, yaw and pitch, likely due to the change in forces applied on the segmented lure by the water as it moves. Specifically, the inventor has found that the greatly increased roll of the segmented lure results in accentuation of other features that may be present on the lure, such as an eye, or fin, or tail. The inventor has discovered that this improved feature greatly improves the attack rate by fish.

The general purpose of the present invention, which will be described hereafter in greater detail, is to provide a new fishing lure and method for employing the same which has many of the advantages of existing fishing lures mentioned above. It also includes novel features that result in a new fishing lure that is not anticipated, rendered obvious, suggested, or even implied by any of the prior art related to fishing lures, either alone or in any combination thereof.

It is inherent in the present invention that features in the prior art may be combined with the present invention. The present invention provides for a fishing lure wherein the body of the non-organic bait comprises a segmented portion of the body of the lure. This feature greatly enhances the movement of the lure through the water and results in a more accurate mimicking of a live organic animal by increasing the roll, pitch and yaw of the lure as it moves through the water. The present invention also provides for a parallel mounted appendage, such as a wing, that may spins in the forward direction of the lure movement. These features are novel and not present in the prior art. When employed individually or collectively each of these embodiments greatly enhances the productivity of a fishing lure.

The more important features of the invention have been broadly outlined in order that the detailed description thereof which follows may be better understood and so that the present contribution to an improvement in the art may be better appreciated. There are additional features of the invention that will be described hereinafter and which will form the subject matter of the claims appended hereto.

With respect to the claims herein, and before describing at least one preferred embodiment of the invention in detail, it is to be understood that the invention is not to be limited in its application to the details of construction and to the arrangements of the components which are set forth in the following description or illustrated in the drawings. The invention is capable of being created in other embodiments and of being practiced and carried out in various ways. Also, it is to be understood that the phraseology and terminology employed here are for the purpose of description and should not be regarded as limiting.

As such, those skilled in the art will appreciate that the conception upon which this disclosure is based, may readily be utilized as a basis for the designing of other forms, structures, methods, and systems for carrying out the several purposes of the present invention. It is important, therefore, that the claims be regarded as including such equivalent constructions in so far as those constructions do not depart from the spirit and scope of the present invention.

Further, the purpose of the appended abstract is to enable the United States Patent and Trademark Office, and the public generally, and especially designers, manufacturers, and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

DETAILED DESCRIPTION OF THE PREFERRED EMBODIMENTS

Figure 1:
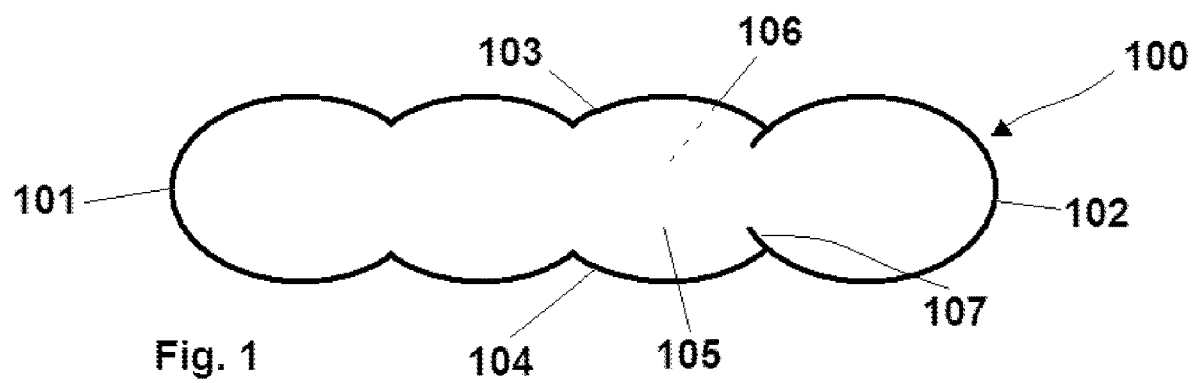
FIG. 1 depicts an example of a three dimensional lure that is segmented.

An artificial, or non-organic, or man-made fishing lure is a preferable substitute for live or organic bait. Bait can be an essential component that is affixed in conjunction with a hook to the end of a fishing line so that a fisherman or an angler may snare, capture, hook or catch a fish. A non-organic artificial lure is often preferred to organic bait because it is more cost-effective, reusable, cleaner, and, in some instances, more effective than live bait. A lure is an object, often designed to resemble fish prey, equipped with one or many hooks or sharp objects used to ensnare or catch fish. The invention described herein may be applicable to any form of fishing, including that intended for commercial, personal, leisure, sport or hunting purposes. The intended purpose for fishing may be to obtain fish for consumption, competition, leisure or any conceivable purpose. The term fish as used herein generally describes those animals of classes Chondrichthyes and Osteichthyes but also includes any water-borne species that may be trapped, ensnared, hooked or caught using the invention.

Typically, an angler or fisherman affixes a lure with (1) hooks for trapping the fish and (2) a fishing line in order to pull or drag the lure through the water. The fishing line is usually attached to a fishing pole or fishing rod, but it may be attached to any article that allows for the lure's retrieval from the water. When an angler casts the lure into water, he may then retrieve the lure by pulling, reeling, or retrieving the lure by pulling the line toward him through the water either while the lure floats upon the water, is submerged under the surface of the water, or a combination of both. A variety of techniques may be used for retrieving the lure in the present invention. First, a lure may be allowed to float in calm or moving waters. Or the lure may be pulled through the water in a uniform direction of desired speed. Often, an angler will make lateral motions upon the lure by moving the fishing pole side to side while the line is being retrieved resulting in a forward zigzag pattern of the lure. Often these techniques may be employed in one smooth event or in a series of events so that the lure mimics some aquatic life form and become attractive to a fish. A lure may also be affixed to the line whereby it is drawn through the water in a process known as trolling. In any of these conditions, the lure exhibits properties of yawing, pitching and rolling, whereby yaw is the lateral or sideways motion (or rotation about the vertical axis), pitch is the vertical motion (or rotation about the left-right longitudinal axis), and roll is the rotation about the front-back longitudinal axis. The inventor has discovered a method that effects each of these directional movements, especially the degree of left and right roll. As a result, the lure may have a greater mimic of a live piece of bait and is consequently more attractive to a fish. The inventor has discovered a significant increase in fish attack of the lure described and claimed herein when used with traditional fishing techniques. It is anticipated that any applicable fishing technique with the lure will be advantageous.

In one embodiment of the invention, the lure is segmented. The segmented lure may be comprised of two or more portions or units that adjoin to form the lure. The units may be of one or more repeating units that adjoin to form the lure. The units may be of the same shape or of different shapes. The sizes of the units may be the same size or may be different sizes. The lure may be comprised of entirely separate units connected to each other in a linear fashion to form a segmented lure. The lure may also be linear, single piece of material with periodic or random grooves placed into the lure to give the appearance or effect of a segmented lure. The lure may also be a combination of separate units adjoined to each other and then ultimately joined to a material with periodic or random grooves that may also be considered segmented, such that the lure is segmented. The segmented lure may be comprised of repeating identical units or units that have no relation to other units in the lure. The units may be general two- or three dimensional geometric shapes, such as, for example, circles or ellipses, or, for example, partial circles or partial ellipses. The units may mimic shapes found in animal body parts, such as, for example, a head, body, thorax, abdomen or wing, or may mimic partial animal body parts, such as, for example, a portion of a thorax or abdomen. Ideally, the lure is a series of adjoined segmented units that form a linear lure to mimic a natural animal, but the segments may be adjoined in alternative fashioned to obtain the same or similar success of a linear lure. The lure may be one solid piece or two or more pieces connected together. The size of the lure may be any size. The inventor has had success in catching fish that are the same size as the lure itself. Typically a lure that is 10 cm in length may be useful for catching fish from 10 cm up to 100 cm. However, the lure may be decreased or increased to any size in order to be attractive to smaller or larger fish as desired. The segments of a lure may be of the same size or of different sizes. shapes. Ideally, a lure is segmented by inserting spatial grooves, wedges, cuts, sections or spaces into a single portion of the lure to achieve segmentation. However, individual, separate units may be adjoined or affixed to each other in order to achieve a segmented lure. The entire lure may be segmented or a portion of the lure may be segmented. Ideally, the lure is rigid, such as with a piece of wood or hard plastic, but it may exhibit some flexibility, as with softer plastic or rubber. As the rigidity of the lure is increased, the effect of the roll is greater, likely due to the required changing water forces upon the lure as it is propelled through the water. A rigid, segmented portion may also be used in conjunction with highly flexibly or elastic portions in order to achieve the same effect.

FIG. 1 is a depiction of a segmented lure 100 that is contemplated by the present invention. In FIG. 1, the lure is comprised of portions or units that make it segmented. The lure is three-dimensional, having a forward side 101 which may be represented by the left side of the figure. The lure also has a backward side 102, which is represented by the right side of the figure. The lure also has a top side 103, which is represented by the top side of the figure. The lure also has a bottom side 104, which is represented by the bottom of the figure. The lure also has a left side 105 which may be represented by the side of the figure extending out of the page. The lure also has a right side 106, which is represented by the side of the figure extending into the page. The lure in FIG. 1 is rotationally symmetrical in any direction, and use of the lure by rotating it in any direction may yield the advantageous effect. It is contemplated by the present invention that one or more segments may be firmly attached to each other or they may rotate against one-another in a joint-like ball and socket fashion as is depicted in FIG. 1 at 107.

Figure 2:
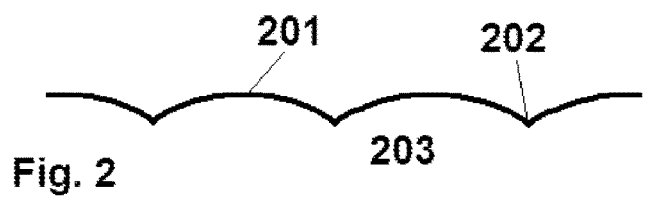
FIG. 2 depicts an example of the surface of a segmented lure.
Figure 3:
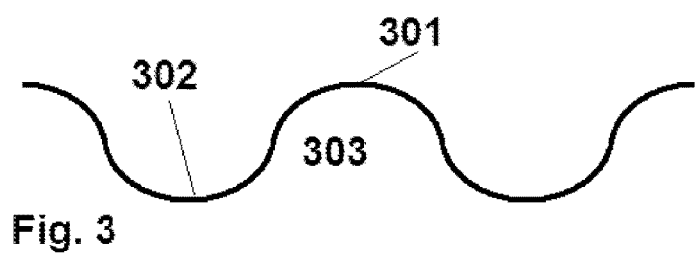
FIG. 3 depicts yet another example of the surface of a segmented lure.
Figure 4:
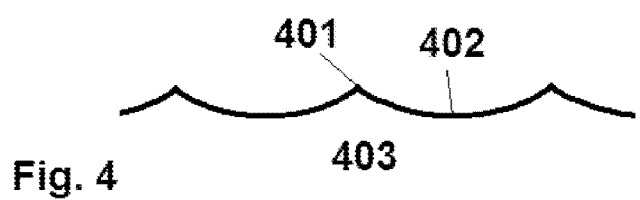
FIG. 4 depicts yet another example of the surface of a segmented lure.

Segmentation is achieved in nature by a series of crests and troughs as indicated in FIG. 2, ideally wherein the outward crests have a soft outward concave region 201 and an inward trough that is brief, sharp and wedge-like 202. 203 designates the inside, or the lure itself. As depicted in FIG. 3, the crests and troughs may also be sinusoidal so that both crests 301 and troughs 302 are smooth curves. 303 designates the inside, or the lure itself. As depicted in FIG. 4, the crests and troughs may also have brief, sharp outward crests 401 and soft inward troughs 402. 403 designates the inside, or the lure itself. It should be noted that any combination of groves, wedges, cuts or spaces placed within one segmented area or within the entire lure, in light of the possible combinations among FIGS. 2, 3 and 4 are contemplated by the invention and will yield a highly successful lure.

Figure 5:
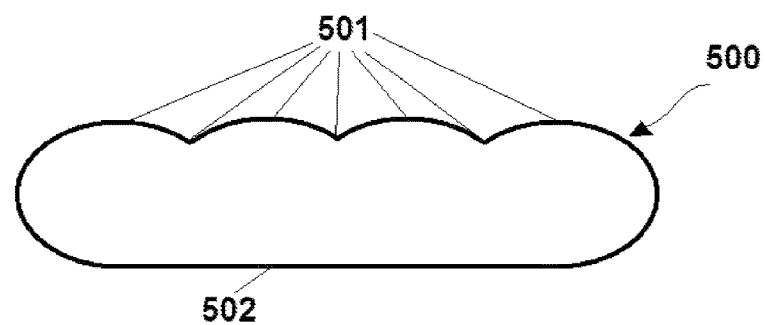
FIG. 5 depicts an example of a partially segmented three dimensional lure.

The lure need not be symmetrical in any direction in order to achieve the maximized effect of the invention. As depicted by FIG. 5, it is contemplated that only a portion 501 of the segmented lure 500 may be segmented while another portion 502 is not segmented and the desired advantageous effect of the invention will be realized.

Figure 6:
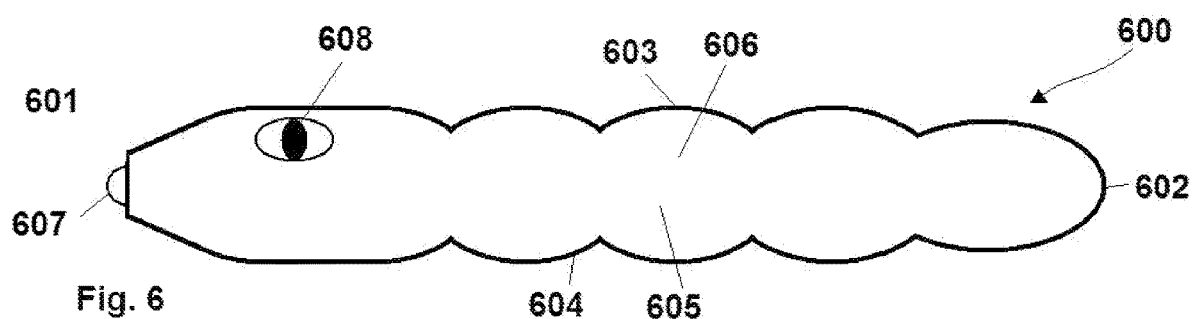
FIG. 6 depicts an example of a segmented lure with orientation and depicts additional features that may be added to the lure.

Ideally, the lure is attached to the string or fishing line at the front or anterior position so that the lure mimics a forward moving animal when tension is applied to the anterior position. Application of a fishing line will allow the angler to draw the lure toward him with forward and or sideways movements to give the lure the effect of swimming. FIG. 6 is a depiction or a segmented lure 600 that is contemplated by the present invention. The lure 600 is three-dimensional, having a front or anterior position 601. The lure also has a back end or posterior position 602. The lure also has a top side, which is represented by the top side or dorsal position 603. The lure also has a bottom side, which is represented by the bottom side or ventral position 604. The lure also has a left side, which is represented by the left lateral side, or the portion that extends out of the page 605. The lure also has a right side, which is represented by the right lateral side, or the portion that extends into the page 606. The lure also may have a connector 607 whereby the fishing line connects to the anterior position in order to move it or tug it in a forward-moving fashion. The lure may also have an anatomical feature such as an eye 608 or other identifiable anatomic feature placed upon the lure. The eye or other feature may be raised or flat against the lure depending on the desired effect sought.

Figure 7:
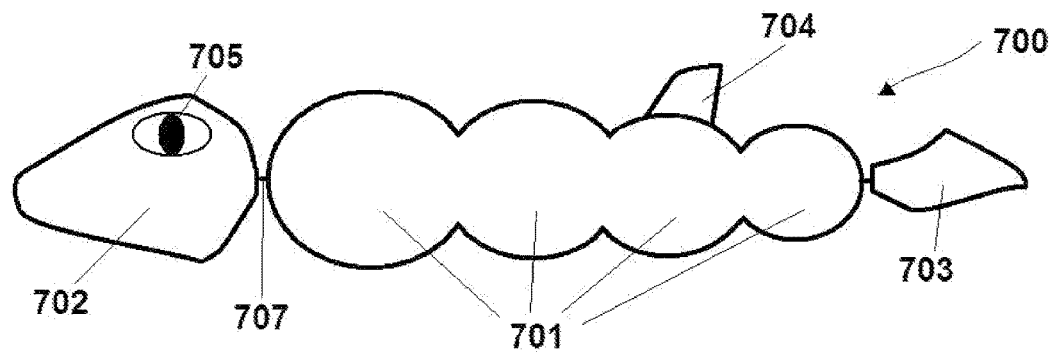
FIG. 7 depicts an example of a separate lure portion wherein other features are attached by a connector.

FIG. 7 depicts a representative segmented lure 700 that has varied segment sizes 701 within a segmented portion of a lure as well as additional features that may be affixed to the segmented portion. The segmented portion also has a head 702 affixed to it at the anterior position by a connector 707. It also has a separate tail or fin 703 connected to the posterior portion of the segmented portion. The head also has an eye 705 which may be applied to the head in any manner. FIG. 7 represents the limitless possibilities of variations and additions that may be applied to a segmented portion to produce a segmented lure described herein.

Figure 8:
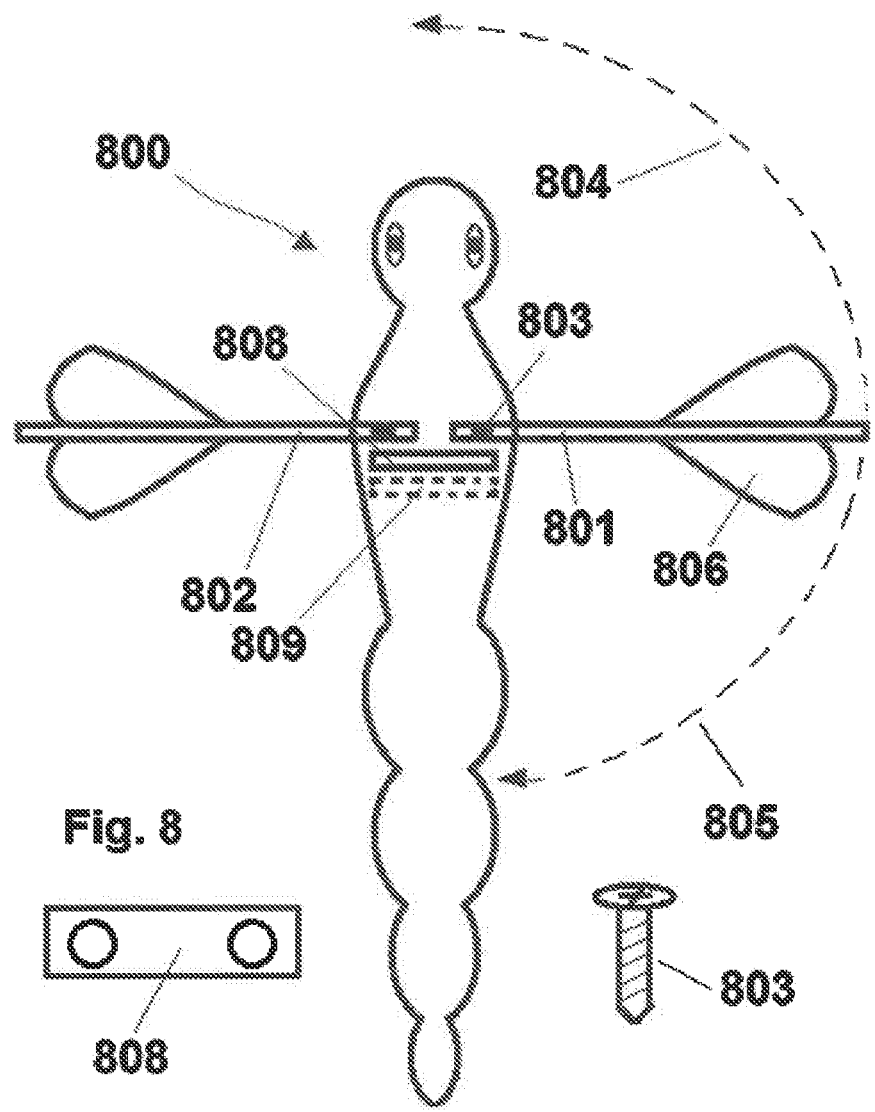
FIG. 8 depicts an example of a rotating and spinning wing bar.
Figure 9:
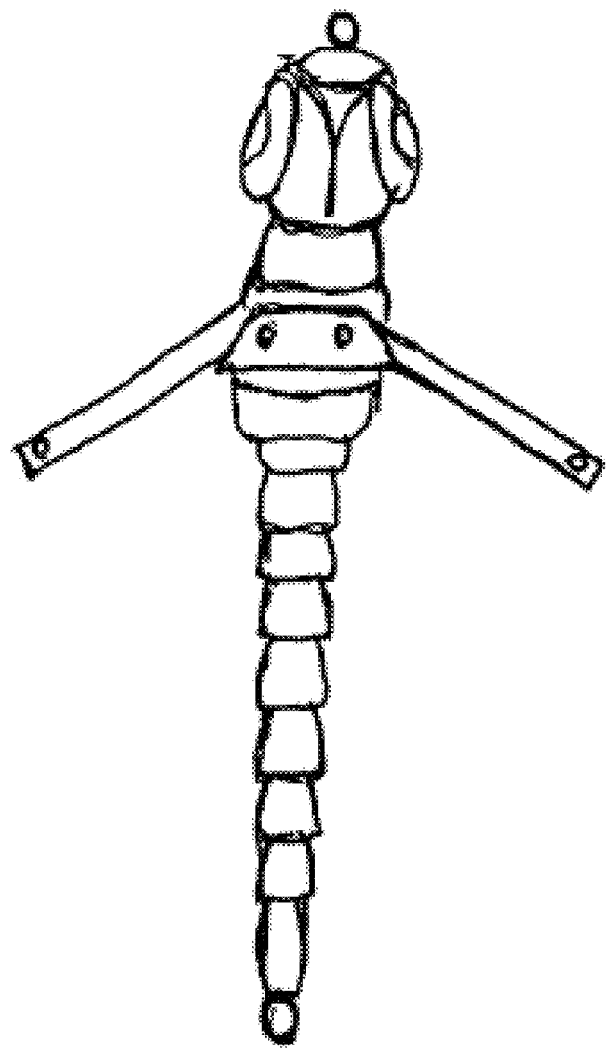
FIG. 9 depicts a top or dorsal view of an embodiment of a lure having a solid lure body with a hinge bracket and wing bars mounted to a top of the lure body, and an eyelet disposed on each of a head of the lure and an end of the tail of the lure.
Figure 10:
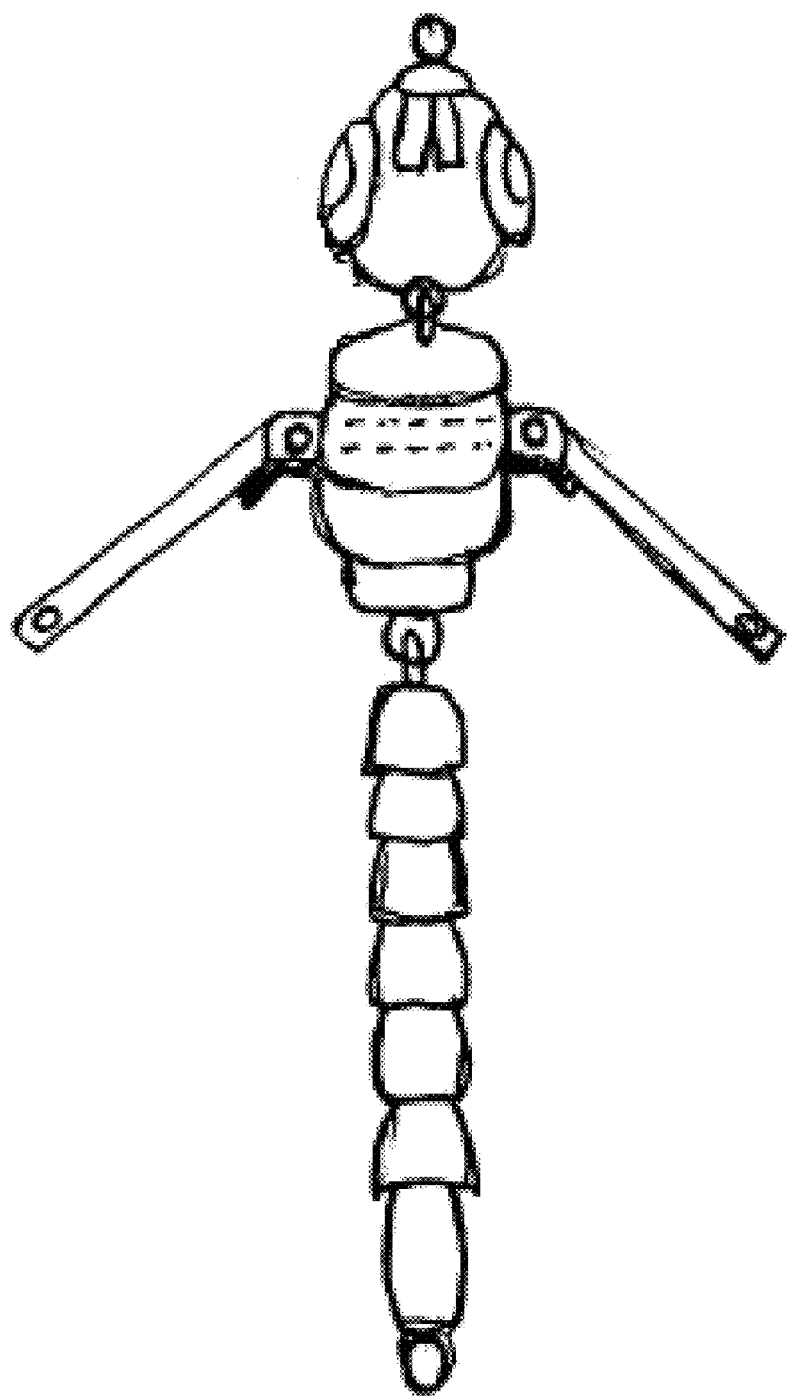
FIG. 10 depicts a top or dorsal view of an embodiment of a double jointed body with wing bars attached to a one piece hinge bracket passing through a center of a body at an angle perpendicular to a longitudinal axis of the body, with an eyelet disposed on each of a head and an end of a tail, a joint disposed between the head and the body, and a joint disposed between the body and the tail.
Figure 11:
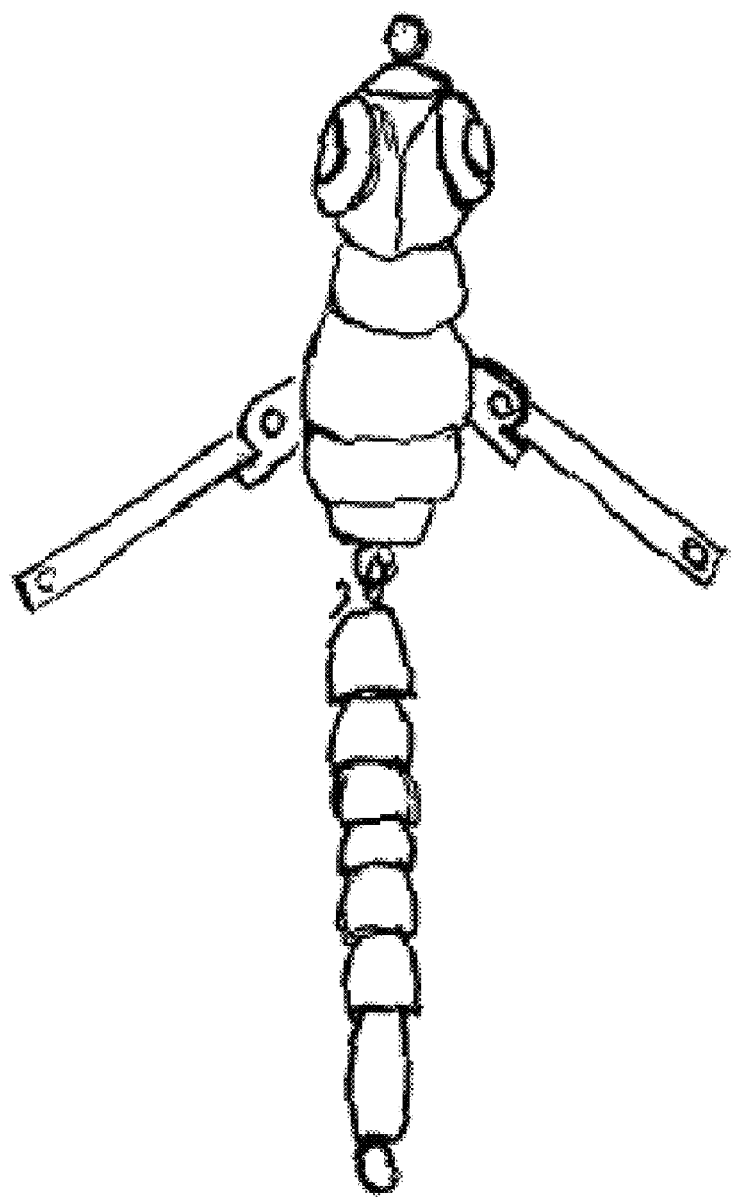
FIG. 11 depicts a top or dorsal view of an embodiment of a jointed lure with wing bars hingedly affixed to separate hinge brackets mounted to a center of the body that are oriented at an angle to a longitudinal axis of the body, with an eyelet disposed on each of the head and an end of the tail, with a joint disposed between a rear of the body and a front of the tail.
Figure 12:
FIG. 12 depicts an embodiment of a pair of wings, each having three wing pedals, or three wing flaps, or three wing propellers.
Figure 13:
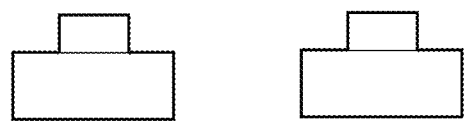
FIG. 13 depicts a side view of an embodiment of a pair of wing bar end caps that are each configured to secure a wing onto a wing bar.
Figure 14:
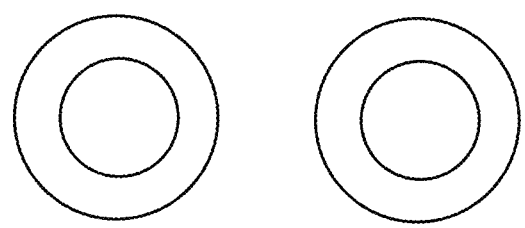
FIG. 14 depicts a top view of a pair of washers that are to be mounted on a wing bar before and after a wing installed on each wing bar.
Figure 15:
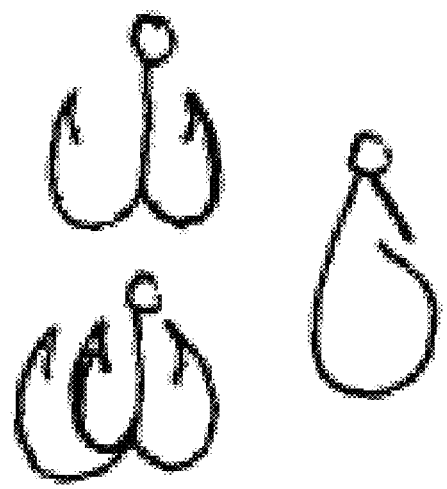
FIG. 15 depicts exemplary embodiments of fishing hooks configured to be affixed to a lure of the present disclosure.
Figure 16:
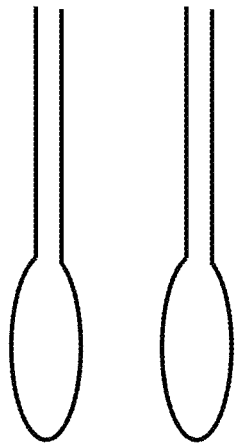
FIG. 16 is a schematic view of a pair of cotter pins configured to secure wings onto a pair of wing bars.
Figure 17:
FIG. 17 is a schematic view of a one piece hinge bracket that is configured to be hingedly connected to a pair of wing bars at opposing ends thereof.
Figure 18:
FIG. 18 is a top schematic view of a pair of wing bars configured to be connected to an embodiment of a hinge bracket.
Figure 19:
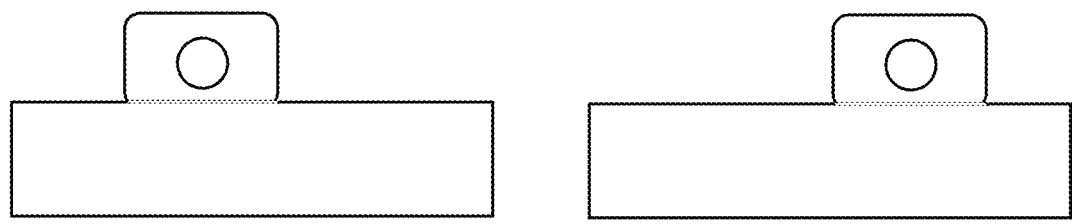
FIG. 19 is a schematic view of an embodiment of a pair of separate hinge brackets that are each configured to connect to a single wing bar.
Figure 20:
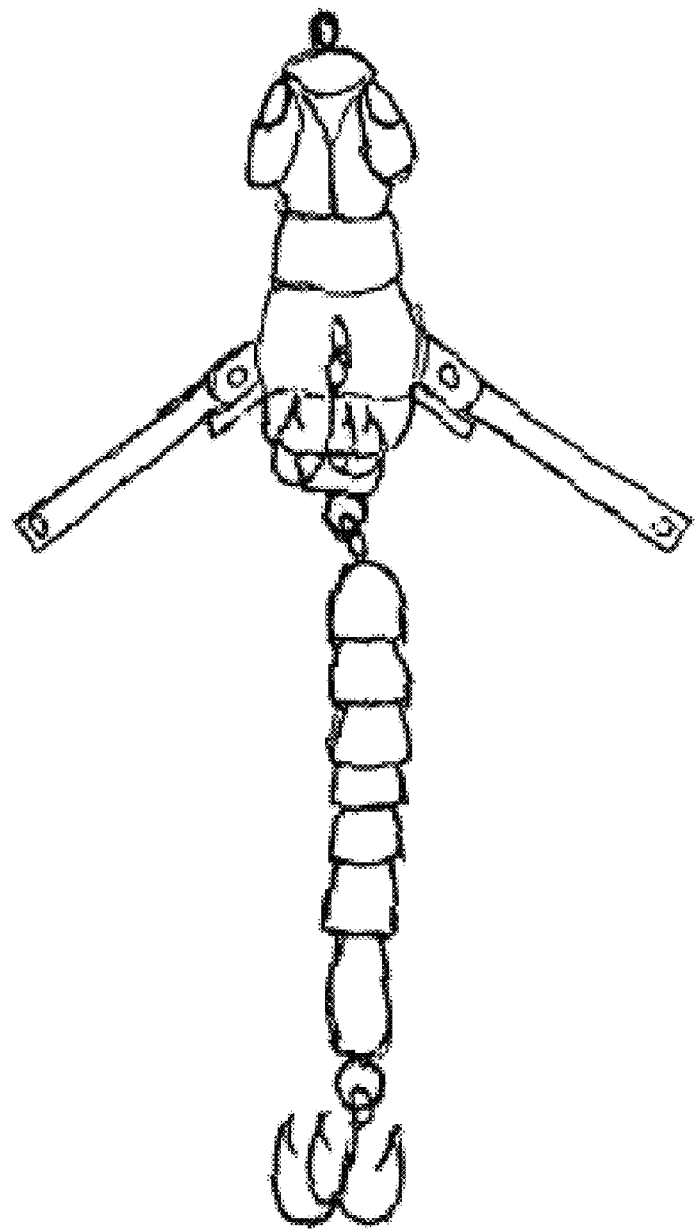
FIG. 20 depicts a bottom view of an embodiment of a jointed lure having wing bars mounted to hinge brackets, which hinge brackets are affixed to a center of the lure body and oriented at an angle thereto, with an eyelet protruding from the head, an eyelet protruding from each of the belly under the body and an end of the tail, to which belly and tail eyelets fishing hooks are affixed.
Figure 21:
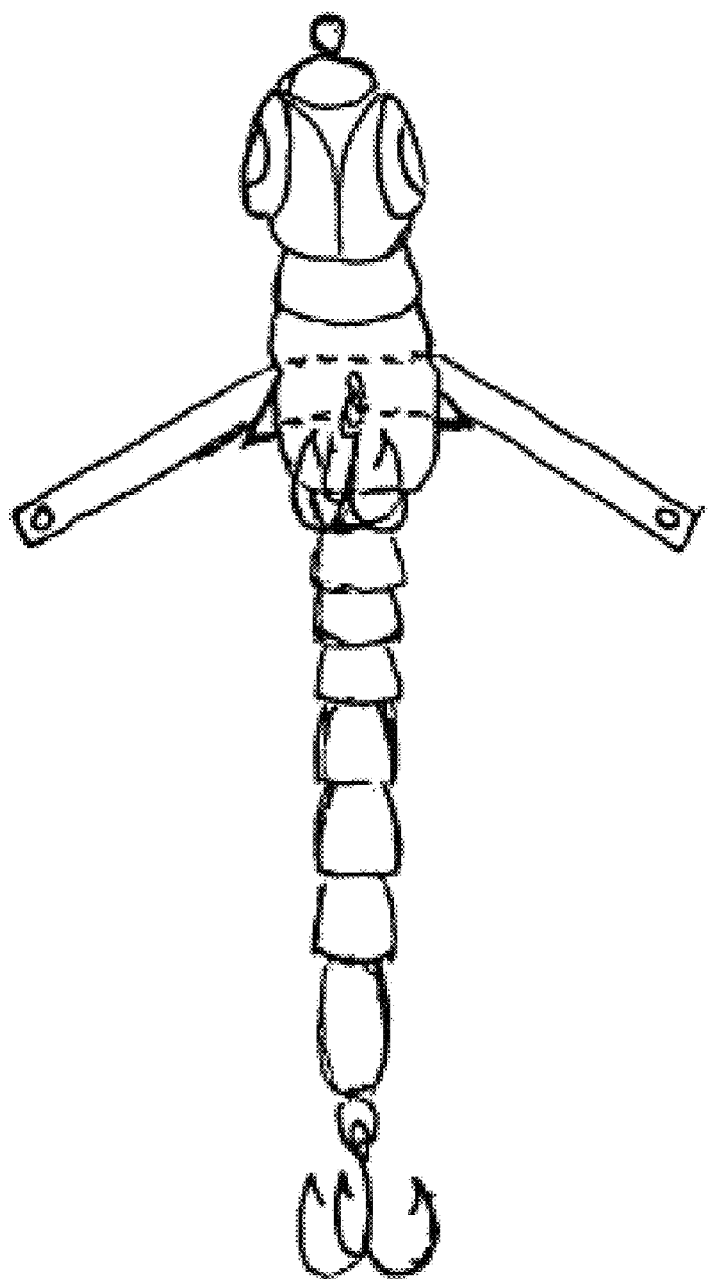
FIG. 21 depicts a bottom view of an embodiment of a solid body lure having wing bars mounted to a hinge bracket disposed on a top or dorsal side of the body, an eyelet disposed at the head, and separate eyelets disposed on each of a bottom side of the body and at an end of the tail to which fishing hooks are affixed.
Figure 22:
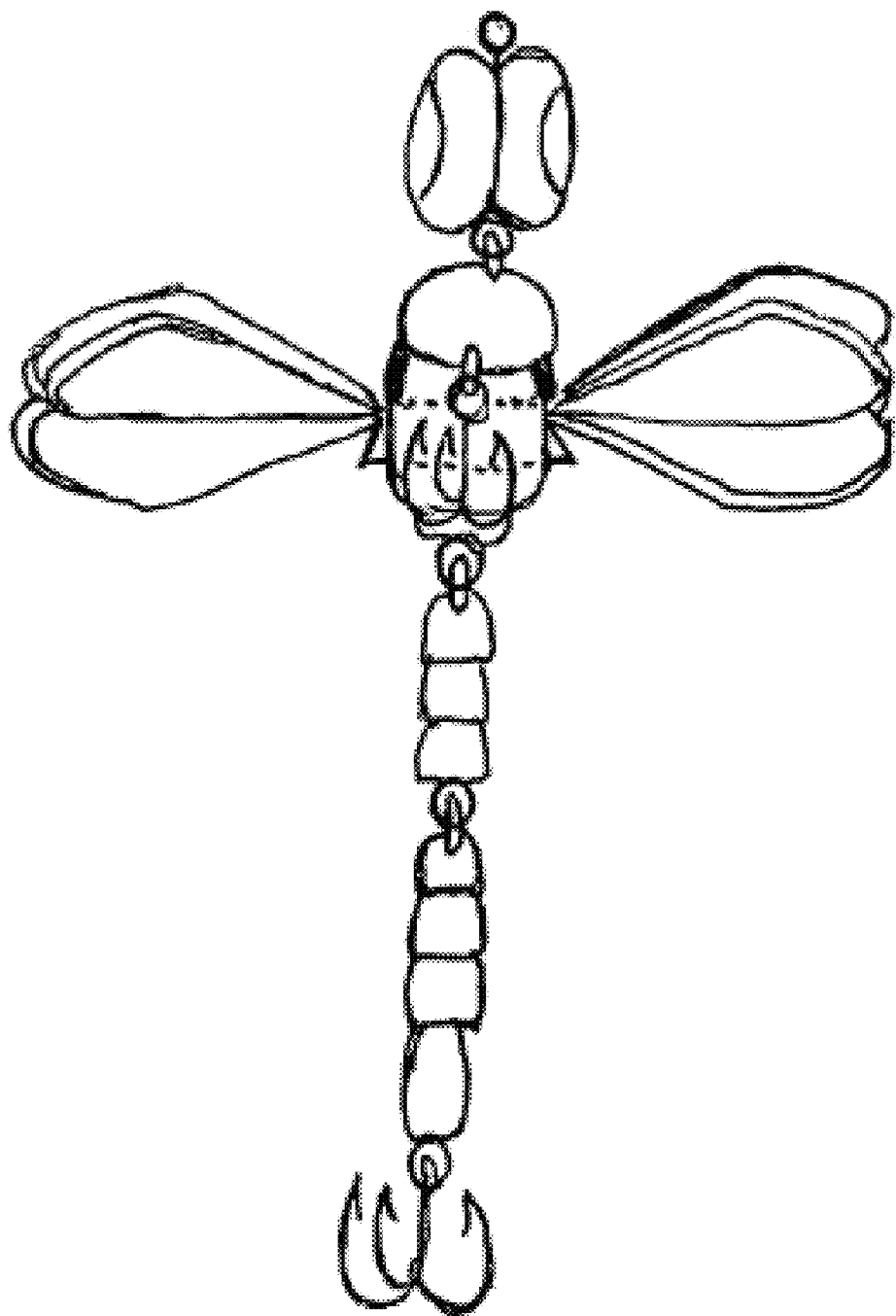
FIG. 22 depicts a bottom view of an embodiment of a triple jointed body, with wings disposed on wing bars that are connected to a hinge bracket mounted on a top or dorsal side of the lure body, an eyelet disposed at a head, a first joint disposed between the head and a front of the body, a second joint disposed between a rear of the body and a front of a first tail section, a third joint in a middle of the tail between a rear of the first tail section and a front of a second tail section, an eyelet disposed on a belly under the body that is affixed to a fishing hook, and eyelet disposed at a rear end of tail that is affixed to a fishing hook.
Figure 23:
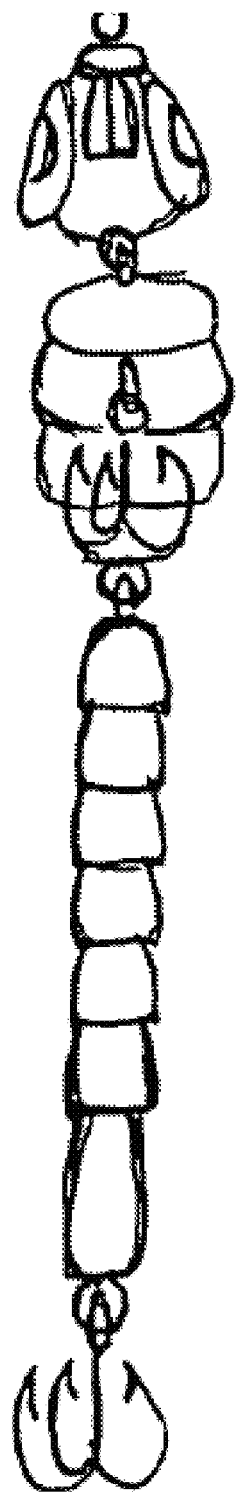
FIG. 23 depicts a bottom view of an embodiment of a double jointed lure with an eyelet disposed at a head, a joint disposed between the head and front end of a lure body, a joint disposed between a rear end of the body and a front end of a tail, an eyelet disposed on a belly under the body affixed to a fishing hook, and an eyelet disposed at a rear end of the tail affixed to a fishing hook.
Figure 24:
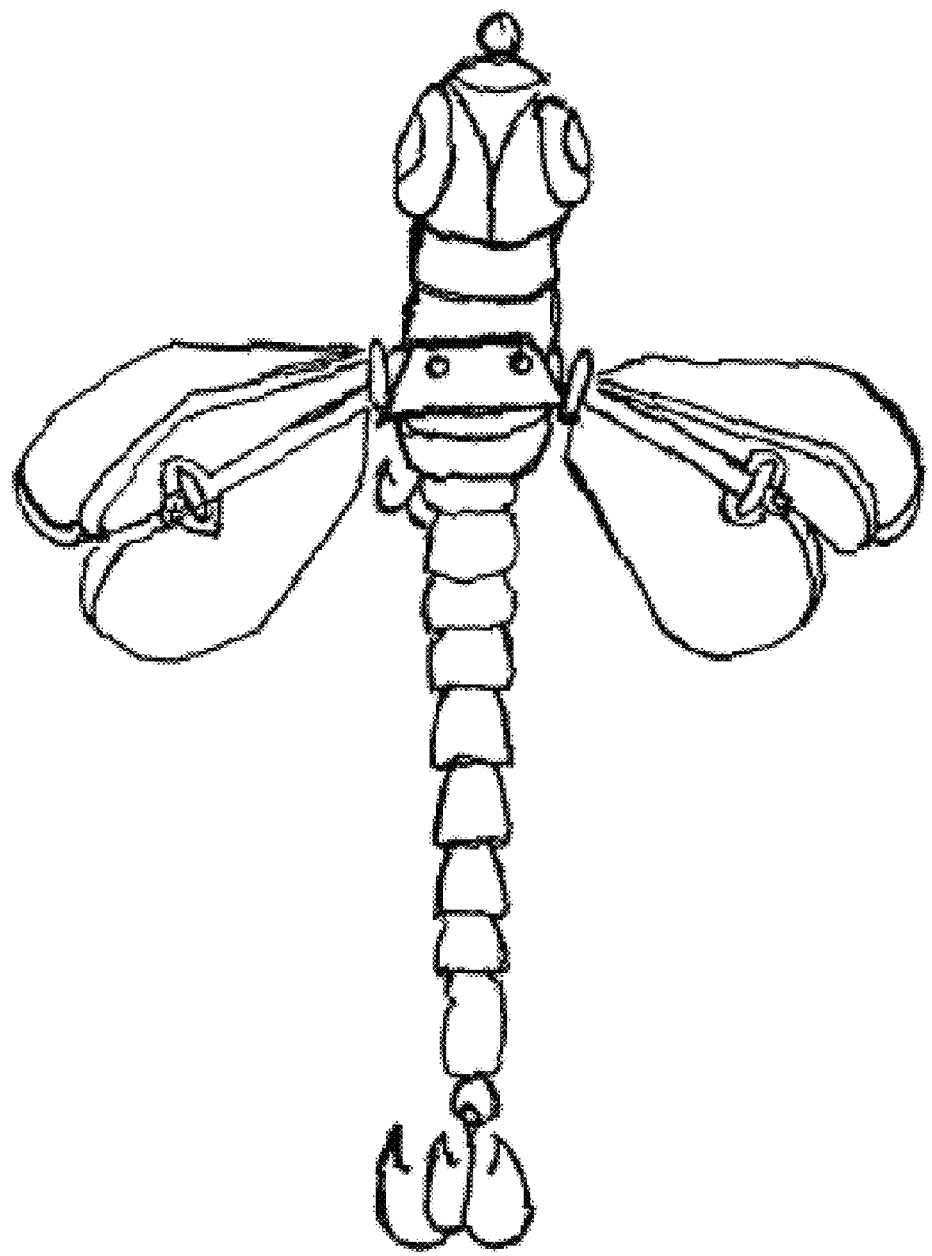
FIG. 24 depicts a top or dorsal view of an embodiment of a fully assembled solid body dragon fly lure with fishing hooks attached thereto by eyelets disposed at each of a belly of the body and a rear end of the tail.
Figure 25:
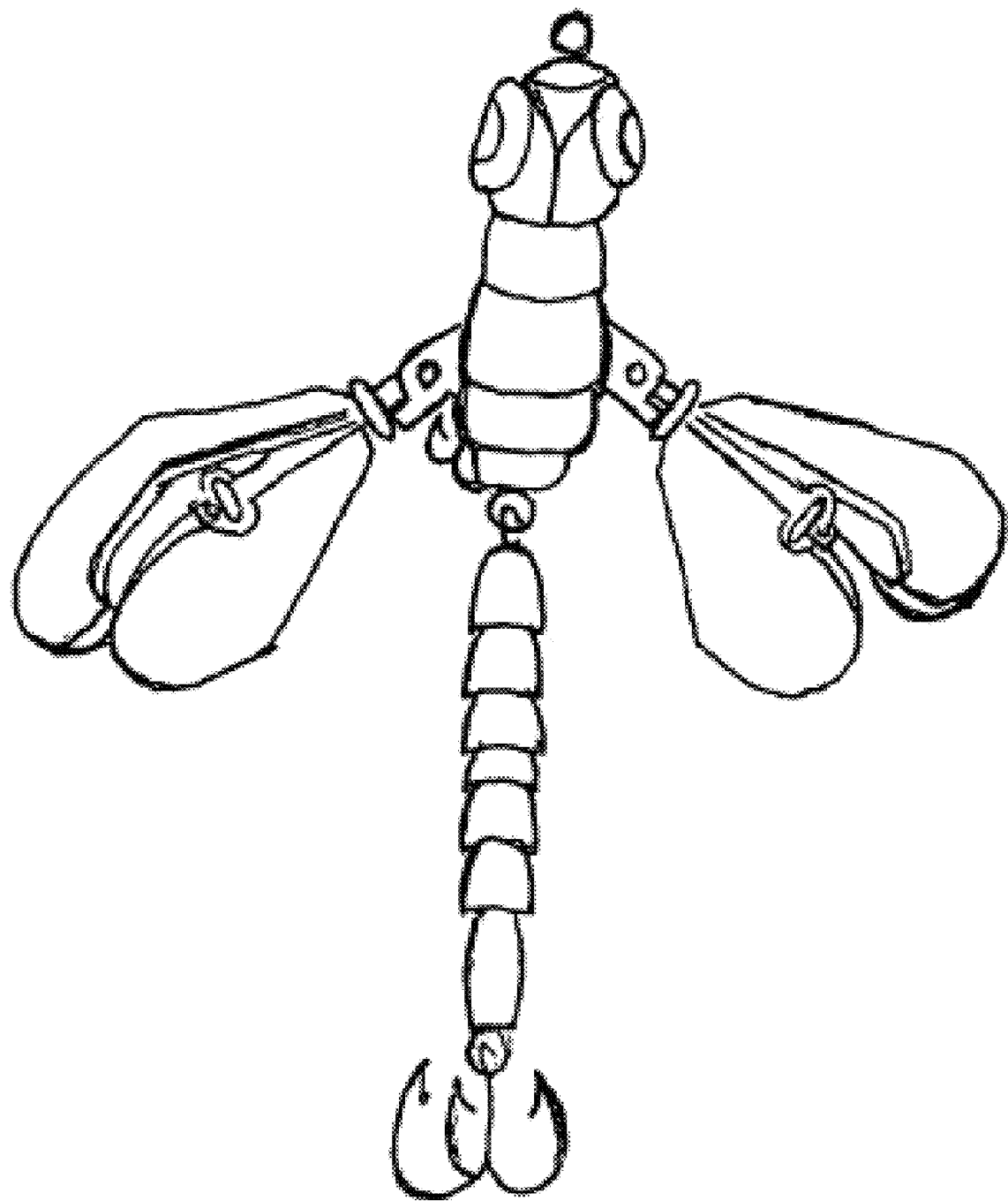
FIG. 25 depicts a top or dorsal side view of an embodiment of a fully assembled jointed lure having joints disposed between each of a rear end of a body and a front end of a tail, with fishing hooks connected to eyelets disposed on a belly of the body and a rear end of tail.
Figure 26:
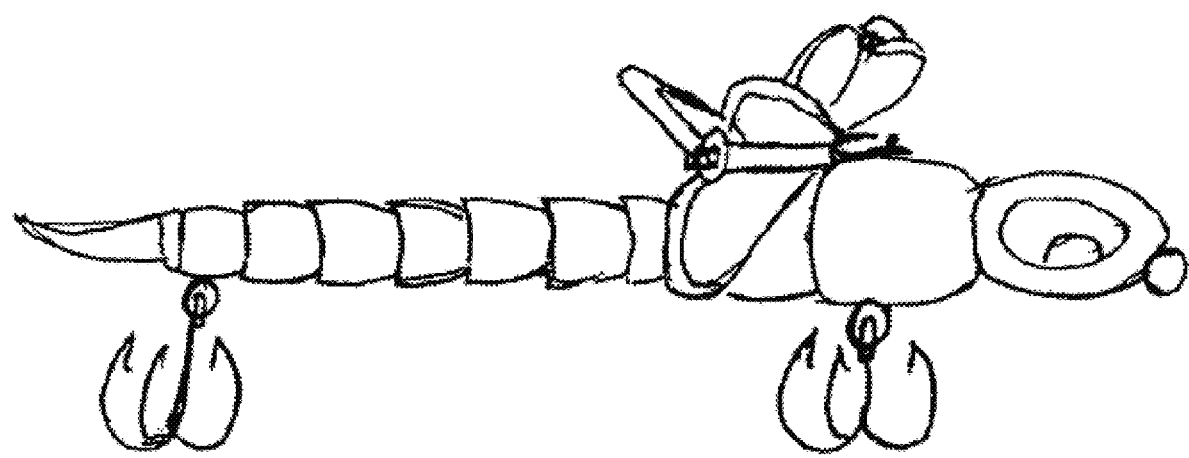
FIG. 26 depicts a right side plan view of an embodiment of a fully assembled solid body lure having top mounted wings secured on wing bars, which wing bars are hingedly connected to top mounted hinge brackets, with fishing hooks connected to eyelets disposed on a belly of the body and on an under side of the tail before a rear end thereof.
Figure 27:
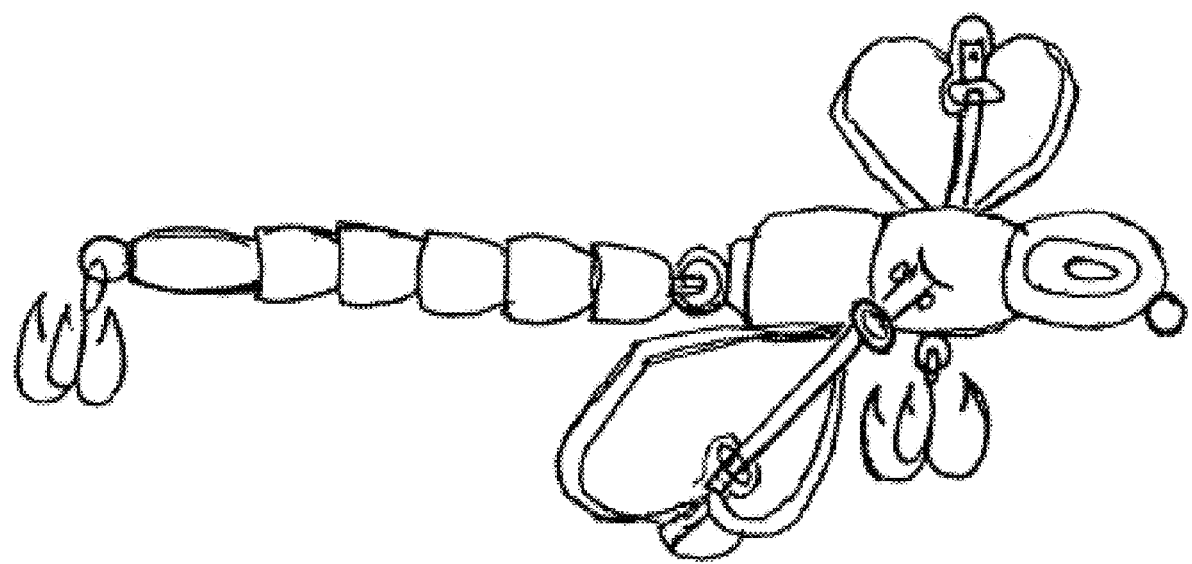
FIG. 27 depicts a right side plan view of an embodiment of a fully assembled jointed lure having hinge brackets mounted to opposing sides of a lure body and oriented at an angle thereto, a joint disposed between a rear end of the body and a front end of the tail, with hooks affixed to eyelets disposed on each of a belly of the body and a rear end of the tail.
Figure 28:
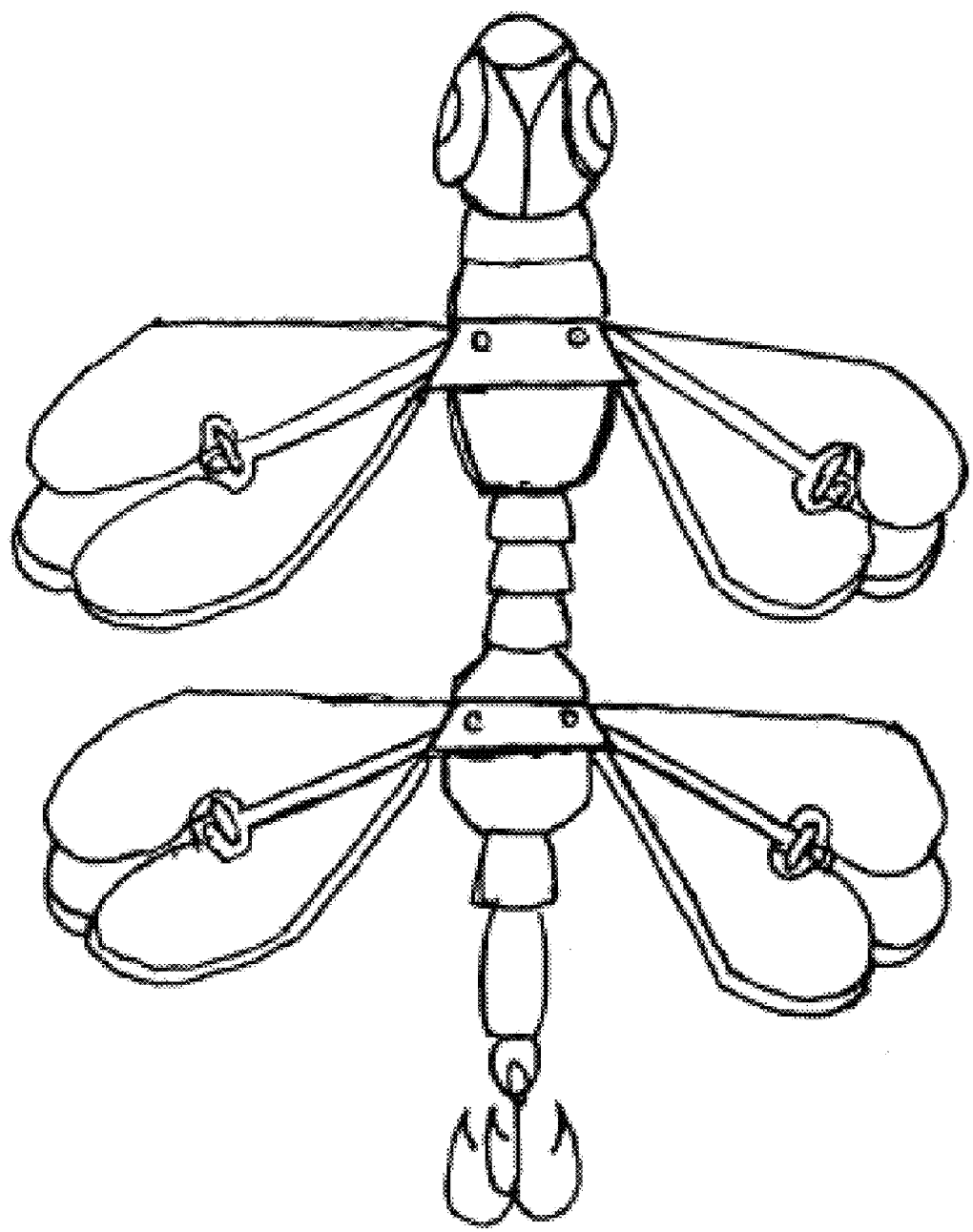
FIG. 28 depicts a top view of an embodiment of a lure of the present disclosure having two sets of wings disposed on a solid body lure.

In yet another embodiment of the invention, the lure is affixed with wings. The inventor has created a type of wing that that has novel features as depicted in FIGS. 8 and 9. The birds-eye or dorsal view of the segmented lure 800 has a wing bar 801, (or pair of wing bars 801 and 802 as would be desirable), that is depicted as parallel and extends laterally or outward from the body of the lure. The dorsal view of the lure has two wing bars which will mount onto a hinge bracket having a wing lock extending therefrom, and extend laterally or outward from the body of the lure. The wing bar 801 is mounted 803 at any desirable place, but ideally on the dorsal part of the lure, in such a way that the wing bar is capable of rotating 804 from the anterior position to the posterior position 805. The wing bar may be attached to a hinge bracket so that the wing bar will rotate posteriorly and anteriorly freely with no resistance. Any conceivable method for mounting the wing bar so that it rotates from the anterior to the posterior position would be useful, including a pin, a cotter pin, a hinge, a joint, spring, or the like. It is a feature of the invention that in addition to the anterior/posterior rotation, the wings that they will spin in a forward or backward manner. In order to accomplish this a blade 806 or series of blades are mounted on the wing bar. The blade is any useful protrusion, such as leaves, propellers, vanes, hair, fur, tassels, trimming or any item that will protrude outward from the wing bar as it spins. If blades are employed, ideally three or four blades are used but more or less than this number will also accomplish the spinning feature. The blade may be flat or curved, and may be of any desirable shape. The blade, or any item that is used to accomplish the spin feature, may be a separate unit affixed to the wing bar or it may be produced so that the blade and wing bar are a single unit. It is yet another feature of the invention that a wing lock 808 is employed at some position posterior to the mounted wing bar to prevent the wing bar from rotating past a certain position posterior or anterior (or both) position. The wing lock may also be part of a hinge bracket that prevents the wing bar from rotating or bending beyond a certain point when the wing bar is affixed to the hinge. The wing lock may be of any form and may be artistically concealed, such that it prevents the wing bar from moving past a certain position. Ideally, the wing lock is placed in such a position that it prevents the wing bar from rotating any further posteriorly than completely perpendicular, or ninety degrees to the front-back longitudinal axis of the body. As a result, when the lure is being retrieved, the wing and blades will spin forward in the direction of the retrieval and give the appearance that the lure is swimming forward. It may be conceivable to place the wing lock more posterior 809 which will allow the wing to spin at a position greater than ninety degrees. While it is believed that the force of lure retrieval or forward movement of the lure in conjunction with the friction of the water is ideal to accomplish the spin, it is also a feature of the invention that the wing may spin as a result of electrical means, such as by a battery, a computer or the like. While this rotating and spinning wing is a novel type of wing, any suitable type of wing may be affixed to the segmented lure.

The wing bar, blade (or substitute), mounting, and wing lock may be comprised of any known materials suitable for making the invention. The items may be made of any color or feature described within this specification or that is obvious to achieve the result of the rotating and spinning wings. It is further an object of the invention that, if desired, the wing bars may be mounted at any position on the wing in order to achieve the desired rotation and/or spin.

Ideally, the segmented portion of the lure is rigid. A rigid lure is one that exhibits little or no flexibility or bending. A rigid lure allows for greater control by the angler of the movements of the lure. While a rigid, segmented lure is preferred, some elasticity, bending, docility, extensibility, flaccidity or suppleness may be employed to make the lure effective. The rigidity of the segmented portion of the lure is a novel feature of the invention because the forces exerted on a rigid lure likely give rise to the increased roll, yaw and pitch of the entire lure, thereby maximizing its attractiveness to fish.

The lure may be one solid body, double jointed, or triple jointed. The lure will imitate the body shapes of actual dragon flies as close as possible and may have their own distinct shape. The lure will be made of four main parts; a head, a body, a tail, and wings. The lure body may be made of wood, plastic, hard rubber, soft rubber, graphite composite, carbon fiber, fiber glass, or metals (for example aluminum, copper, steel, stainless steel, magnesium, etc.).

The wings of the lure may be made of plastic, wood, metal, rubber, plexiglas, lucite, fiberglass, or carbon fiber for example. The lure wings may be clear, painted with or without veined design, stained, or painted any color with a variety of paints, including, for example, enamel, acrylic, metallic, glitter based, gloss finished, or latex based. The wings of the lure may be twisted, bent, straight, curved, or tilted, and may vary in shape, size, or design without limiting the scope of the present disclosure. Each wing of the lure may be made of any number of pieces, or wing flaps. Each lure may include two completely assembled wings. Alternatively, each lure may include two separate sets of wings (i.e. four separate wings), with a first set of wings spaced apart form the second set of wings at any distance along a longitudinal length of the body. The wings may be one solid cast or molded part. Alternatively, the assembled wings may include wing flaps or pedals mounted to an outer surface of a hollow tubular shaft, which hollow tubular shaft is slidably assembled onto the wing bar.

The wings are mounted onto a wing bar and may be secured to the wing bar by a small washer and wing bar end cap. The wing bar may alternatively be threaded to accommodate an end nut that is configured to hold the wing on the wing bar. The wing bar may alternatively have a soldered bead at end of the wing bar that is larger than a hole of the washer so that the wing will not slip off of an end of the wing bar. The wing bar may have a hole defined through the end of the wing bar to accommodate a cotter pin that is configured to hold the washer and the wing on the wing bar. Alternatively, the washer may be soldered or welded onto the wing bar to keep the wing on the wing bar. The washer may alternatively be glued, or fastened by epoxy, to the end of the wing bar, or the wing bar may simply have a bent end to keep the wing on the wing bar. The washer may be made of any type of metal, plastic or rubber. The wings, whether assembled from wing flaps mounted on a tubular shaft or molded as a single solid piece, will have a hollowed center or drilled out hole, so the wings will be able to slide onto the wing bar through the hollowed center. After a wing is slidably mounted onto a wing bar, the wing will be free spinning about the wing bar. The hole through the center of each wing will be slightly larger in diameter than an outer diameter of the wing bars. This will allow the wings to spin freely, propel in a spinning or twisting motion, or rotate in a clockwise or counter-clockwise motion about the wing bar. In embodiments in which the wings are not made of a single solid molding or cast, wing flaps are mounted onto a tubular hollow shaft, and the hollow tubular shaft slides onto the wing bar. When the wings and wing bar are mounted to the body of the lure, the wings may be positioned horizontally to the body of the lure or may be set back at any angle to the longitudinal axis of the body of the lure. The wing bars may be of any length, or diameter. The wing bars may have any shape, such as for example, round, square, triangular, octagonal. The wing bars may be made with, or hingedly attached to, a hinge bracket so that the wing bars may rotate back and forth, or up and down freely with respect to the hinge bracket, with no resistance. In one embodiment, the wing bar may be hingedly attached to a hinge bracket by elbow bars, or more commonly called, hinge pins, which hinge pins can be for example, a rivet, by a small bolt and nut, a cotter pin, a small rod flattened on both ends, an insert tube capped on both ends, a tied wire made of any metal, or a screw passing through both of the hinge bracket and a mount hole in an end of the wing bar. All of the aforementioned examples of hinge pins will have a smaller outer diameter than a diameter of the mount hole in the end of the wing bar through which the hinge pin is inserted, so as not to impede free rotation of the wing bar on the hinge pin. Wing bars may be made of, for example, any metal, flexible plastic, rubber, graphite, wood, or carbon fiber. Hinge brackets and/or the associated hinge pins, may be made of any of the same materials from which the wing bars may be made. In one embodiment, the hinge brackets may be mounted into the side of the lure body at locations of the body at which holes are defined in the lure body for insertion of hinge pins. In an alternate embodiment, hinge brackets may be integrally formed into the lure body by inserting hinge brackets into the mold that forms the cast lure body while the lure body is being molded/made, such that the hinge bracket is fused/molded into the lure body when the body casting is cured or hardened. Hinge brackets may also be inserted into the lure body, through predrilled holes in the sides of the lure body, after the body has been made, and securing the hinge brackets in the lure body with glue, adhesive, screws, or epoxy. In one embodiment, there may be two hinge brackets affixed to the lure body, each configured to form a hinge with a wing bar mounted thereto. eone single hinge bracket may be affixed to the lure body, which single hinge bracket is configured to form two separate hinges with wing bars mounted on opposing ends thereof. In such embodiment, the single hinge bracket with two opposing hinges may be inserted into the lure body and secured thereto, for example with glue, epoxy, hardening adhesive, or screwing the hinge bracket into the lure body. In embodiments with two separate hinge brackets, each hinge bracket will have a small shaft that will be separately attached to the lure body at opposing sides thereof, then be secured by glue, epoxy, or hardening adhesive. The wing bars will be mounted to the hinge bracket(s) via insert tube, rivet, screw, wire, or bolt and nut. The hinge bracket(s) with attached wing bars and wings may also be mounted on the top of the lure body, or separately on the left or right side of the lure body, and secured thereto. The hinge bracket(s) may also be mounted to a separate small bracket, screwed, glued, or fastened with epoxy to the top of body. In making the lure body, the small bracket may be placed into the mold for the lure body, such that the small bracket becomes molded into the lure body to form one solid lure body piece. In some embodiments, the small shaft of each hinge bracket may be inserted into the lure body through the center of the body, or at any angle into the body. In some embodiments, each hinge bracket may include at least one wing lock defined thereon, that may be for example an extended length of material disposed behind or posterior to each wing bar, which wing lock extends outward away from the body and behind each wing bar for a short distance, so as to physically contact and stop the wing bar rotating rearwardly past a specific angle to the longitudinal axis of the lure body when the wing bar makes contact with the wing lock.

Fishing hooks may be affixed to the lure. For a single body lure, a metal rod or wire may be inserted through the longitudinal axis of the lure from head to tail, and form an eyelet or loop at the head and at the tail of the lure body. The eyelet or loop disposed at the head is configured to attach to fishing line. The eyelet or loop at the end of the tail is configured for mounting to a fishing hook. In an alternate embodiment, the metal rod or wire may also be inserted through the longitudinal axis of the lure body beginning at the lure head where an eyelet is formed at one end of the rod or wire. The rod or wire may then extend longitudinally through the body to approximately the center of a length of the body, where the rod or wire bends downward and exits a belly area of the lure to form a small eyelet or loop at the belly of the lure. The rod or wire then re-enters the lure body again at the belly area and runs back up to, and further extends along, the center longitudinal axis of the lure body, exiting out of the tail, and forming another eyelet or loop at the end of the tail. In still alternate embodiments, a double jointed lure may use the same rod or wire as in the single body lure, but with the rod or wire separated into two pieces. A first piece of the rod or wire will be inserted into the one piece head and body section of the lure, and a second piece of rod or wire will be inserted into the separate tail section of the lure. In such embodiment, the first piece of rod or wire will start at the head and run through a center of the body, exiting the body and terminating with an eyelet or loop formed at an end of the body section. The second piece of rod or wire will have an eyelet or loop formed at the beginning of the tail section, then continue to extend through a center longitudinal axis of the tail section, and exit at an end of the tail section, forming another eyelet or loop. For a double jointed lure, the same techniques will be used to form eyelets or loops at every joint in the lure, and the rod or wire piece that exits the end of the tail forms an eyelet or loop to which a hook may be mounted. Such eyelets or loops would be formed behind a head section and at the front of a body section to join the head to the body, behind the body section and the front of a tail section to join the body to the tail, and at the end of the tail. In yet additional alternate embodiments, eyelets or loops may also be screws with eyelets formed thereon that are used at the beginning of the head, the end of the tail, or at all joints between the various body sections. Screws with eyelets may be used for any of the above embodiments of the lure. Fish hooks may also be mounted anywhere along the lure starting at head and ending at tail.

In still alternate embodiments, a wing may also be mounted on a wing bar, and have two holes drilled through each wing bar, one at each opposing end of the wing bar. Wings will fasten onto a wing bar in the same manner as previously disclosed. A hollow tube may be inserted laterally through a center of the lure body. A first end of a spring will be connected to an inner hole drilled in the end of one wing bar that is closest to the lure body. The second end of the spring will be inserted into and passed through the center of the hollow insert tube and connected to the inner hole in the other wing bar, thus pulling the connected inner ends of the two wing bars towards each other by the spring connected therebetween, and into the hollow tube. All eyelets and hook mounts may be affixed to the lure as previously disclosed.

Single, double, and triple jointed lures will have separate body parts, which parts are not limited to being defined by any specific area of the lure body.

All wing bars and hinge brackets may be used on any body style, single, double, or triple jointed lures.

There may be an unlimited number of joints or connections throughout the entire lure.

Hinge brackets may also be part of the lure body, while the body is being produced or made, and not a separate part of the body.

The lure may be comprised of any material that is suitable for production of the lure or for making the lure effective. The lure may be comprised of plastics, including thermosets or thermoresins or thermosettings, for example, including acetal, acrylic, acrylonitrile-butadiene-styrene, alkyds, cellulosics, coumarone-indene, diallyl phthalate, epoxy, fluoropolymer, latex, malamine-formaldehyde, nitrile resins, nylon, petroleum resins, phenolic, polyamide-imide, polyarylates, polybutylene, polycarbonate, polyethylene, polyimides, petroleum resins, phenolic, polyamide-imide, polyarylates, polybutylene, polycarbonate, polyethylene, polyimides, polymethyl acrylate, polyphenylene oxide, polyphenylene sulfide, polypropylene, polytetrafluoroethylene, polystyrene, polyurethanes, polyvinyl acetate or other vinyls, polyvinyl chloride, styrene acrylonitrile, styrene butadiene latexes or other styrene copolymers, sulfone polymers, thermoplastic polyester, unsaturated polyester, urea-formaldehyde, or any suitable plastic or polymer, or any combination of such plastics or polymers. The lure may comprised of wood including but not limited to natural or synthetic forms of combinations of cellulose, hemicelluloses, lignin or other material and may be a soft wood or hard wood such as, for example, cedar, balsa, oak, chestnut, ash, cherry, buckeye, poplar, willow, black locust, *catalpa*, elm, hickory, mulberry, or any type of natural or synthetic wood or combination suitable to make the invention. The lure may be comprised of metal such as, for example, aluminum, titanium, chromium, manganese, iron, copper, zinc, nickel, silver, palladium, platinum, gold, or alloys such as of iron (steel, stainless steel, cast iron, tool steel, and alloy steel), copper, aluminum, titanium, copper and magnesium or any suitable metal or alloy or combination thereof. The lure may be comprised of glass, such as for example, silicon dioxide, soda-lime glass, borosilicate glass, acrylic glass, sugar glass, muscovy-glass, or any type of glass suitable for making the lure. The lure may also be comprised of rubber, such as, for example, acrylic rubber butadiene rubber, butyl rubber chlorobutyl rubber, chlorinated polyethylene rubber, chlorosulphonated polyethylene rubber, epichlorhydrin ethylene acrylic rubber, ethylene propylene rubber, fluoroelastomers, hydrogenated nitrile rubber, isoprene rubber, natural rubber, nitrile rubber, perfluoro elastomers, polychloroprene rubber, polynorbomene rubber, polysulphide rubber, polyurethane rubber, silicone rubber, fluorosilicone rubber, styrene butadiene rubber, tetra-flouroethylene/propylene, or any combination thereof, or any rubber, synthetic or natural that is suitable for the invention. The lure may also be comprised of stone (such as marble and other minerals), hair, fur, cloth, fiber, paper or any material or combination of materials suitable for making the lure.

The lure may be comprised of a substance or substances described above that may be coated with a particular material. A coating may be applied to the lure in order to protect or enhance, for example, the appearance, adhesion, wetability, corrosion resistance, wear resistance, scratch resistance, chemical vulnerability, electrical conductivity or resistance, dielectrical, temperature control, abrasion, or solubility of the lure. It is anticipated that certain coatings may be desirable for any number of conditions. Coatings may be, for example, of any color, including being opaque, translucent, transparent reflective anti-reflective, refractive, polarized, ultraviolet, infrared, or optical, and may have biological or chemical effects such as anti-fouling (to resist slime buildup) or organic (as in an attractive food source such as salts, lipids, carbohydrates, proteins or pharmaceutical agents). Coatings may be for applied to provide adhesiveness, tackiness or lubrication. Coatings may include such coatings, for example as paint, enamel, urethane, acrylic, epoxy, hybrid, latex, emulsion, metallic, silicone and polytetrafluoroethylene coatings and may employ such compounds as Teflon®, Teflon-S®, Teflon PFA®, Teflon TFE®, Tefzel/ETFE® & Teflon PEP®, Krytox®, Vydax®, Silverstone®, Xylan®, Dykor®, Castall®, Halar®, Emralon®, Kynar®, Electrofilm®, Everlube®. Coatings may be of any desired thickness, which may or may not be uniform across the surface of the lure. Coatings may be applied as gasses, liquids or solids. Coatings may include labels, decals, shrink wrap, liners, adhesives, or any material useful in applying and advantageous coating. Coating may be used in combination of one another or separately or in combination in various parts of the lure.

The surface of the segmented lure may be smooth or textured, including, for example, such textures as matte, glossy, scaled, rough, etched, porous and the like. The surface may further have natural features such as naturally occurring anatomic features, including, for example, a mouth, tongue, teeth, fangs, labrum, labium, bill, beak, whiskers, scales, eyes, compound eyes, olfactory bulb, ocelli, gills, ears, wings, antennae, antennules, chiliped, necks, arms, legs, claws, nails, fins, tails, telson, genitals, gonads, shells, umbrella, tentacles, canals, clitellum, thoraxes or abdomens or any other advantageous biological feature to render to the lure life-like.

The lure may be solid or hollow, in whole or in part. It may be desirable to create a lure, or a portion of the lure, that is hollow, for example, as an industrial advantage (such as for preparation as in the employment of injection molding preparation) or for weight and floatation qualities desired in the lure, or for the insertion of objects (such as, for example, electrical or mechanical components). It may be desire to create a lure, or a portion of a lure, that is solid, for example, as an industrial advantage (such as in the employment of saw-cutting machines or for carving) or for weight and flotation qualities.

A segmented lure may be comprised of the addition to or deletions of portions of the lure that increase or decrease the weight and or buoyancy of the lure. Weights may be affixed to the lure, for example, on the back end, middle, or front end of the lure to cause to lure to submerge in whole or in part under the surface of the water. Floats, and or floats and weights, may also be affixed to a lure in order to achieve a certain depth at which a lure will "swim."

The lure may be comprised of any color or combination of colors that is or are desirable. For example, it may be desirable to apply colorings to body portions of the lure that are similar to those found in nature, or that are contrasting with one another and are therefore attractive to fish. The inventor has found that affixing or applying "eyes" to each side of the anterior portion of the fish, wherein the eyes are bright yellows, oranges and reds, accentuated by a black or dark outline are very attractive to fish when the roll angle of the fish is maximized (e.g. the eye of the lure rolls from a horizontal position to a vertical position and results in an attack of the lure by a fish).

The lure may be affixed with a crank or bill, which when applied to the front of the lure, causes the lure to dive underneath the surface of the water when the lure is retrieved. A forceful retrieval of a lure affixed with a crank results in a lure swimming submerged in the water.

Application of sideways movements by the angler on the lure will further cause the lure to roll as it "swims" submerged. More than one crank placed on other parts of the lure may be desirable.

The lure may be scented or scents may be applied to a lure to make it more attractive.

Scents may include any substance that emits odor molecules that may be attractive to fish, such as spices, fish, fruits, vegetables, meat, cheese, neutralizer or any natural or natural or synthetic item that emits an odor.

The lure may be affixed with an item or material that generates sound or uses sound devices. One common method to generate sound is to fill a hollow portion of a lure with pellets or beads that shake, rattle or click when the lure is pulled. Other mechanism that provide sounds are spring action mechanisms, electronic devices, spinners, or computers. Any method capable of producing sound is anticipated and may be desirable.

The lure may be affixed with an item or material that generates light. Light may be produced by a lure by hemoluminescence, bioluminescence, phosphorescence, cathodoluminescence, scintillation, electroluminescence, sonoluminescence, triboluminescence, or electronic means. A lure may be coated with a paint that luminesces, reflects, refracts or glows in order to produce light. Light may be of any color or duration, and may be of any intensity, frequency, wavelength, polarization or phase.

The segmented lure may also be affixed with one or more segmented pieces, For example, a segmented lure body may be affixed with a head and or tail, of any length, or two or more segmented portions may be affixed to each other.

The lure may be affixed with other items, such as spinners, or it may be used in conjunction with other lures, such as a spoon lure, a jig lure, a fly lure, a bucktail lure, or other wobbler, rattler, chopper or plug type lures.

It is an object of the present invention to affix a hook or series of hooks to the segmented lure. A hook may be any substance that is capable of catching a fish once the fish attacks the lure. Ideally a hook is made of metal or wire and has a sharp object for penetrating and therefore ensnaring the fish. Numerous types of hooks are known in the art and would be applicable to affix to the invention. A hook may be of any known type, such as a j-type hook, a Carlisle hook, a Limerick hook, an Aberdeen hook, a Kirby hook, an O' Shaungessy hook, a cam action hook, a sneak hook, a sproat hook, a breakpoint hook, or a specialty hook, such as a wide gap, pike, tone circle, barbless, bent down, hump shank, weedless or any type of hook used to trap the fish. The hook may be a single hook or may be affixed in conjunction with other hooks so that there are multiple hooks affixed to the lure. A hook may be affixed to the lure as a fixed hook or a swinging hook. A hook may be a barbed hook or a barbless hook. While a hook is the most popular item for trapping the fish, it is anticipated that any object that may stun or incapacitate a fish in conjunction with the lure may be suitable.

It is yet another embodiment of the present invention to affix a fishing line to the lure. A fishing line may be any line, such as a monofilament, nylon, Dacron, fluorocarbon or other polymer, or gel-spun and aramid fibers such as Spectra, Kevlar and Dyneema. The line may be fly-line, plastic or plastic-coated, cloth (such as silk, cotton or wool) metal or any material or combination of materials suitable for casting, placing or pulling a line on or through water. Fishing lines may be a single strand, braided, fused, tapered or spun. Lines may be of any length, diameter, thickness, sensitivity, knot strength, pressure strength or tensile strength, buoyancy, tangle resistance, texture or color.

What is claimed is:

1. A fishing lure, comprising:
a longitudinal body having a posterior section and an anterior section and extending along a front-back longitudinal axis, the longitudinal body including at least one hinge bracket having a first hinge section and a second hinge section
a first wing bar configured as a unitary round bar having a mount hole defined at a first end there, that is hingedly and rotatably coupled at the first end to the first hinge section of the hinge bracket at the anterior section of the body by a first hinge pin inserted through each of the body and the first mount hole, so as to be hingedly coupled to the body, the first wing bar configured to hingedly rotate about the first hinge pin in each of a posterior direction and an anterior direction relative to the body;
a second wing bar configured as a unitary round bar having a mount hole defined at a first end thereof, that is hingedly and rotatably coupled at the first end to the second hinge section of the hinge bracket at the anterior section of the body by a second hinge pin inserted through each of the body and the second mount hole, so as to be hingedly coupled to the body, the second wing bar configured to hingedly rotate about the second hinge pin in each of the posterior direction and the anterior direction relative to the body, wherein the first and second wing bars are affixed to the body at respective positions on the body that are laterally opposite each other;
a first wing comprising a hollow tubular shaft and at least one blade extending outward from a surface of the tubular shaft, the tubular shaft of the first wing is slidably fully mounted on the first wing bar and configured to freely spin about an outer surface of the first wing bar;
a second wing comprising a hollow tubular shaft and at least one blade extending outward from a surface of the tubular shaft, the tubular shaft of the second wing is slidably fully mounted on the second wing bar and configured to freely spin about an outer surface of the second wing bar; and
a first wing lock adjacent and posterior to the first end of the first wing bar; and
a second wing lock adjacent and posterior to the first end of the second wing bar, wherein the first wing lock and the second wing lock are each outwardly extending portions of the hinge bracket at the locations of each of the respective first and second hinge sections that are each disposed posterior to the respective first and second wing bars, and each of which extends laterally outward away from the body behind each of the respective first wing bar and second wing bar, and wherein the first and second wing locks each configured to stop their respective first and second wing bars from rotating any further in the posterior direction past a position at which each wing bar is oriented perpendicular to the front-back longitudinal axis of the body.

2. The fishing lure of claim 1, wherein the first wing bar is directly coupled to the body by the first hinge pin passing through each of the mount hole of the first wing bar and the body, and the second wing bar is directly coupled to the body by the second hinge pin passing through each of the mount hole of the second wing bar and the body.

3. The fishing lure of claim 1, wherein the hinge bracket comprises:
a first hinge bracket including each of the first hinge section to which the first wing bar is rotatably coupled, and the first wing lock; and
a separate second hinge bracket including each of the second hinge section to which the second wing bar is rotatably coupled, and the second wing lock.

4. The fishing lure of claim 1 wherein the body contains at least one joint to allow one portion of the body to move freely with respect to a second portion of the body.

5. The fishing lure of claim 1, wherein the first wing lock limits rotation of the first wing bar and the second wing lock limits rotation of the second wing bar.

6. The fishing lure of claim 5, wherein:
the first wing lock further limits the rotation of the first wing bar about the first hinge pin in the anterior direction to a position where the first wing bar is generally parallel to the front-back longitudinal axis of the body; and
the second wing lock further limits the rotation of the second wing bar about the second hinge pin in the anterior direction to a position where the second wing bar is generally parallel to the front-back longitudinal axis of the body.

7. The fishing lure of claim 5, wherein the first wing lock is configured to engage with the first wing bar and the second wing lock is configured to engage with the second wing bar.

8. The fishing lure of claim 1, wherein the first wing lock is a part of the first hinge section of the hinge bracket and the second wing lock is a part of the second hinge section of the hinge bracket.

9. The fishing lure of claim 1, wherein the body includes a front body section, a middle body section, and a rear body section.

10. The fishing lure of claim 9, wherein the front body section is secured to the middle body section with a first joint that allows the front body section to move freely with respect to the middle body section.

11. The fishing lure of claim 10, wherein the middle body section is secured to the rear body section with a second joint that allows the middle body section to move freely with respect to the rear body section.

12. The fishing lure of claim 11, further comprising a head section.

13. The fishing lure of claim 12, wherein the head section is secured to the front body section with a third joint that allows the head section to move freely with respect to the front body section.

14. The fishing lure of claim 12, further comprising an eyelet secured to the head.

15. The fishing lure of claim 1, wherein the first hinge and the second hinge are integrated into a single component secured to the body.

16. The fishing lure of claim 1, further comprising an eyelet secured to the body and a hook secured to the eyelet.

* * * * *